US012775689B2

(12) United States Patent
Henry

(10) Patent No.: US 12,775,689 B2
(45) Date of Patent: Oct. 27, 2026

(54) SYSTEMS AND METHODS FOR CORRECTING DATA TO MATCH USER IDENTITY

(71) Applicant: Meta Platforms, Inc., Menlo Park, CA (US)

(72) Inventor: Colleen Kelly Henry, Oakland, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1334 days.

(21) Appl. No.: 17/349,469

(22) Filed: Jun. 16, 2021

(65) Prior Publication Data

US 2022/0405361 A1 Dec. 22, 2022

(51) Int. Cl.
*G06F 21/32* (2013.01)
*G06N 20/00* (2019.01)
*G06V 40/16* (2022.01)

(52) U.S. Cl.
CPC ............ *G06F 21/32* (2013.01); *G06N 20/00* (2019.01); *G06V 40/165* (2022.01); *G06V 40/169* (2022.01); *G06F 2221/2141* (2013.01)

(58) Field of Classification Search
CPC . G06F 21/32; G06F 2221/2141; G06N 20/00; G06V 40/169; G06V 40/165
See application file for complete search history.

(56) References Cited

U.S. PATENT DOCUMENTS 12,004,871 B1 * 6/2024 Fazeli .................. A61B 5/0064
2018/0365874 A1 12/2018 Hadap et al.
(Continued)

FOREIGN PATENT DOCUMENTS

KR 2008033781 A * 4/2008
KR 20080033781 A * 4/2008 ............ G06T 13/40
KR 20120052228 A * 5/2012 ............ G06F 3/017

OTHER PUBLICATIONS

Ryan Parreno (NBA 2K15 Adds Face Scanning for Custom Characters For PlayStation 4 and Xbox One, Published 2014, see attached article) (Year: 2014).*
(Continued)

*Primary Examiner* — David Yi
*Assistant Examiner* — Syed Rayhan Ahmed
(74) *Attorney, Agent, or Firm* — EVERSHEDS SUTHERLAND (US) LLP

(57) ABSTRACT

A computer-implemented method for correcting data to match user identity may include (i) receiving user input specifying an aspect of physical presentation of the user that does not match an authentic identity of the user, where the authentic identity of the user includes a realistic version of the user that reflects an internal self-image of the user, (ii) capturing, via a sensor, data of the user that includes the aspect of the physical presentation of the user, (iii) correcting the captured data of the user to portray a corrected version of the aspect that matches the authentic identity of the user, and (iv) storing the corrected data of the user that matches the authentic identity of the user instead of uncorrected data of the user that includes the aspect that does not match the authentic identity of the user. Various other methods, systems, and computer-readable media are also disclosed.

19 Claims, 10 Drawing Sheets

(56) References Cited

U.S. PATENT DOCUMENTS

2020/0234482 A1* 7/2020 Krokhalev ........... G06V 40/167
2021/0327135 A1* 10/2021 Borovikov ............ G06F 18/214

OTHER PUBLICATIONS

YouTube video entitled âVoicemod Pro (testing ALL Voices) â 2021!â, uploaded on Apr. 7, 2021 by user âAwall Digital â Andrew Wall.â Retrieved from internet https://www.youtube.com/watch?v=kF6HB26oRr0. (Year: 2021).*
YouTube video entitled aHow to Join Zoom Meetings Using Real-Time Deep Fakes, a uploaded on Jun. 16, 2020 by user âHarrison McIntyreâ. Retrieved from internet https://www.youtube.com/watch?v=16GX8SBB2Rk (Year: 2020).*
YouTube video entitled "How to Join Zoom Meetings Using Real-Time Deep Fakes," uploaded on Jun. 16, 2020 by user "Harrison McIntyre". Retrieved from internet https://www.youtube.com/watch?v=16GX8SBB2Rk. (Year: 2020).*
YouTube video entitled "Voicemod Pro (testing ALL Voices)—2021!", uploaded on Apr. 7, 2021 by user "Awall Digital—Andrew Wall." Retrieved from internet https://www.youtube.com/watch?v=kF6HB26oRr0. (Year: 2021).*
Viazovetskyi et al. (StyleGAN2 Distillation for Feed-Forward Image Manipulation, Published 2020). (Year: 2020).*
Necsulescu et al. (Subject-in-the-loop System for Auditory Feedback based Voice Retraining, Published 2011). (Year: 2011).*
https://github.com/alievk/avatarify-python, authored by Alievk, using the Wayback Machine, the webpage dated May 18, 2021. ( Year: 2021).*
Cao et al. (Displaced Dynamic Expression Regression for Real-time Facial Tracking and Animation, published 2014) (Year: 2014).*
Transcript for Awall reference YouTube Video (Year: 2021).*
Transcript for Mcintyre reference YouTube Video (Year: 2020).*
Ali A., "GitHub—alievk/avatarify-desktop at 559924fe6b62312c3155c1216c68ccc9afec1b00," Mar. 17, 2021, 6 pages, XP055964367, Retrieved from the Internet :URL:https://github.com/alievk/avatarify-desktop/tree/559924fe6b62312c3155c1216c68ccc9afec1b00.
Blanz V., et al., "A Morphable Model for the Synthesis of 3D Faces," Computer Graphics and Interactive Techniques, 1999, pp. 187-194.
International Search Report and Written Opinion for International Application No. PCT/US2022/033631, mailed Oct. 5, 2022, 14 pages.
Martins P., "Parametric Models of Shape and Appearance (AAMs)," YouTube, Feb. 15, 2013, XP055964416, 2 pages, Retrieved from the Internet: URL:https://www.youtube.com/watch?v =-ICNgb4t6Do.
McIntyre H., "How to Join Zoom Meetings Using Real-Time Deep Fakes!," You Tube, Jun. 16, 2020, 2 pages, Retrieved from the Internet : https://www.youtube.com/watch?v=16GX8SBB2Rk.
Stratvert K., "Snap Camera Filter with Microsoft Teams Tutorial," YouTube, Feb. 22, 2021, XP055964381, 2 pages, Retrieved from the Internet: URL:https://www.youtube.com/watch?v=kYzgtDTf8ow.
Thies J., et al., "Neural Voice Puppetry: Audio-Driven Facial Reenactment," European Conference on Computer Vision (ECCV), Aug. 23-28, 2020, vol. 12361, XP055964236, pp. 716-731, Retrieved from the Internet: URL:https://ink.springer.com/content/pdf/10.1007/978-3-030-58517-4.
Thies J., "Neural Voice Puppetry: Audio-driven Facial Reenactment," You Tube, Dec. 16, 2020, XP055964553, 2 pages, Retrieved from the Internet: https://www.youtube.com/watch?v=iFJuskGpWJw.
Mazovetskyi Y., et al., "StyleGAN2 Distillation for Feed-Forward Image Manipulation," arXiv preprint arXiv:2003.03581, 2020, 18 pages.
Wall A., "Voicemod Pro (Testing ALL Voices)—2021," You Tube, Apr. 7, 2021, XP055964385, 2 pages, Retrieved from the Internet : URL:https://www.youtube.com/watch?v=kF6HB26oRrO.
Zhang T., "Deep Appearance Models for Face Rendering," You Tube, Sep. 1, 2018, XP055964406, 2 pages, Retrieved from the Internet : URL:https://www.youtube.com/watch?v=31Z2KGH11RO.

* cited by examiner

SYSTEMS AND METHODS FOR CORRECTING DATA TO MATCH USER IDENTITY

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
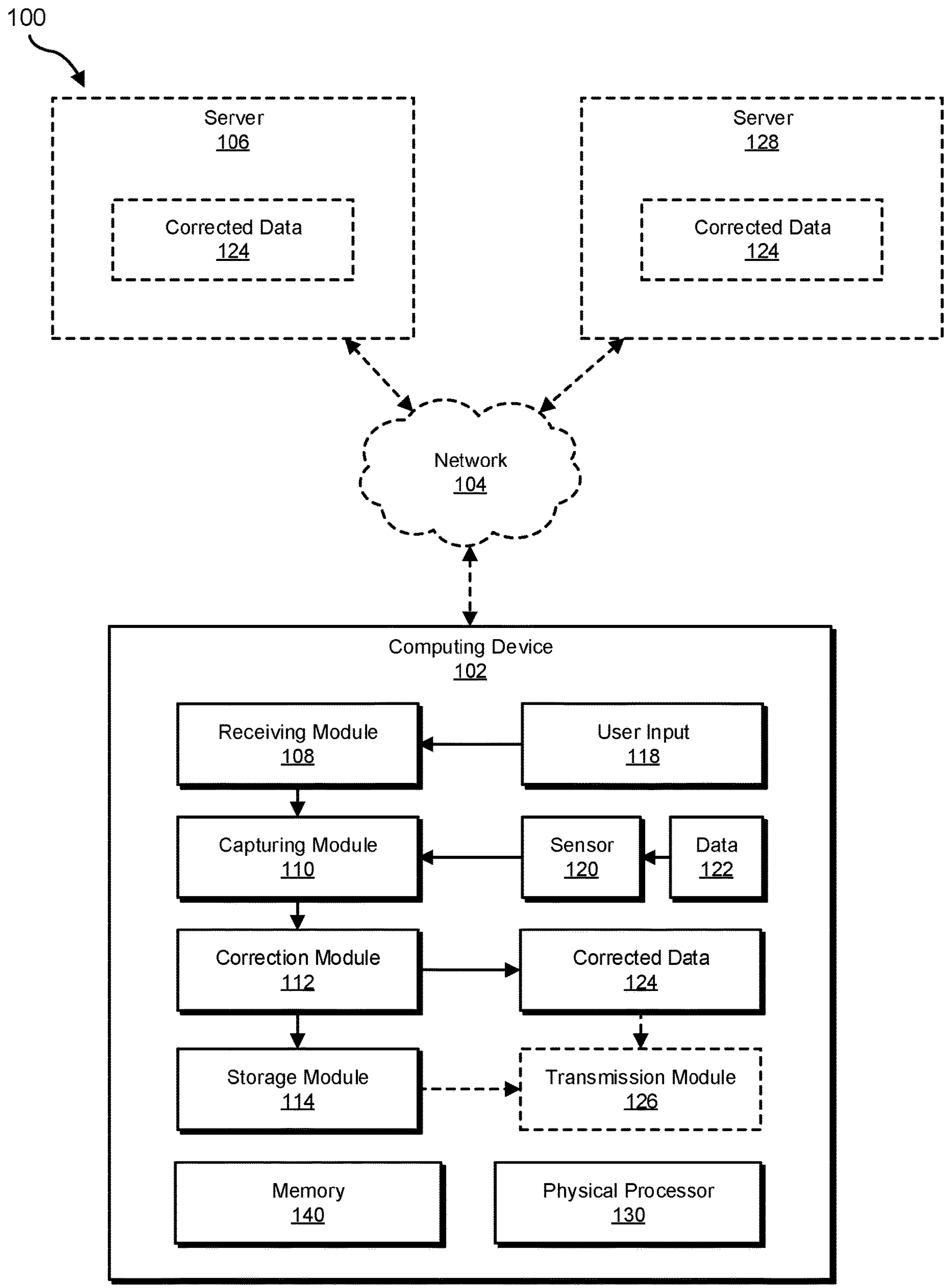
FIG. 1 is a block diagram of an exemplary system for correcting data to match user identity.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for enabling users to interact in digital and artificial reality environments with an authentic presentation that matches their identity. In some embodiments, the systems described herein may train a machine learning model on a set of pre-labelled data and use that model to modify audio, video, and/or static images of users to reflect the user's identity. For example, the disclosed systems may modify data to correct a user's gender presentation to match their identity, remove slurring from a user's speech (e.g., a stroke survivor), and/or remove facial scarring (e.g., for an acid attack victim). In some embodiments, the systems described herein may correct a user's presentation in real-time (e.g., during a live call and/or streaming video). In some examples, the system may automatically update presentation corrections as a user transitions or recovers from injuries in order to enable a seamless, consistent presentation. In one embodiment, the real-time presentation correction may take place entirely client-side without sending any uncorrected video, audio, or other user-identifying data to a server. In some embodiments, the systems described herein may be platform-agnostic, enabling users to maintain consistent, authentic presentation across multiple platforms.

In some embodiments, the systems described herein may improve the functioning of a computing device by enabling the computing device to effectively correct user data. Additionally, the systems described herein may improve the fields of digital communication, artificial reality, and/or social media by enabling users to present consistent, authentic versions of their identity in digital spaces.

In some embodiments, the systems described herein may operate on a computing device, such as an endpoint computing device. FIG. 1 is a block diagram of an exemplary system 100 for correcting data to match user identity. In one embodiment, and as will be described in greater detail below, a computing device 102 may be configured with a receiving module 108 that receives user input 118 specifying an aspect of physical presentation of the user that does not match an authentic identity of the user (where the authentic identity of the user includes a realistic version of the user that reflects an accurate internal self-image of the user). Capturing module 110 may capture, via a sensor 120, data 122 of the user that includes the aspect of the physical presentation of the user. Next, correction module 112 may correct the captured data 122 of the user to portray a corrected version of the aspect that matches the authentic identity of the user. Storage module 114 may store the corrected data 124 of the user that matches the authentic identity of the user instead of uncorrected data 122 of the user that includes the aspect that does not match the authentic identity of the user.

In some embodiments, a transmission module 126 may transmit corrected data 124 to one or more additional devices and/or servers. For example, transmission module 126 may transmit corrected data 124 to a server 106 and/or a server 128 via a network 104. In some examples, transmission module 126 may refrain from transmitting uncorrected data 122 and/or may transmit corrected data 124 in lieu of uncorrected data 122. In one embodiment, transmission module 126 may prevent uncorrected data 122 from being transmitted from computing device 102 (e.g., to server 106 and/or any other additional device). Although illustrated as separate elements, one or more of the modules in FIG. 1 may represent portions of a single module or application.

Computing device 102 generally represents any type or form of computing device capable of reading computer-executable instructions. For example, computing device 102 may represent an endpoint computing device (e.g., a personal computing device). Examples of computing device 102 may include, without limitation, a laptop, a desktop, a wearable device, a smart device, an artificial reality device, a personal digital assistant (PDA), etc.

Sensor 120 may generally represent any type or form of hardware and/or software that is capable of capturing audio and/or visual data. In some examples, sensor 120 may be a built-in sensor of computing device 102. Additionally or alternatively, sensor 120 may be a peripheral sensor connected to computing device 102. In some examples, sensor 120 may be an optical sensor and/or an audio transducer. Examples of sensor 120 may include, without limitation, a camera and/or a microphone.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of the modules in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more modules stored in memory 140. Additionally or alternatively, physical processor 130 may execute one or more modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 2:
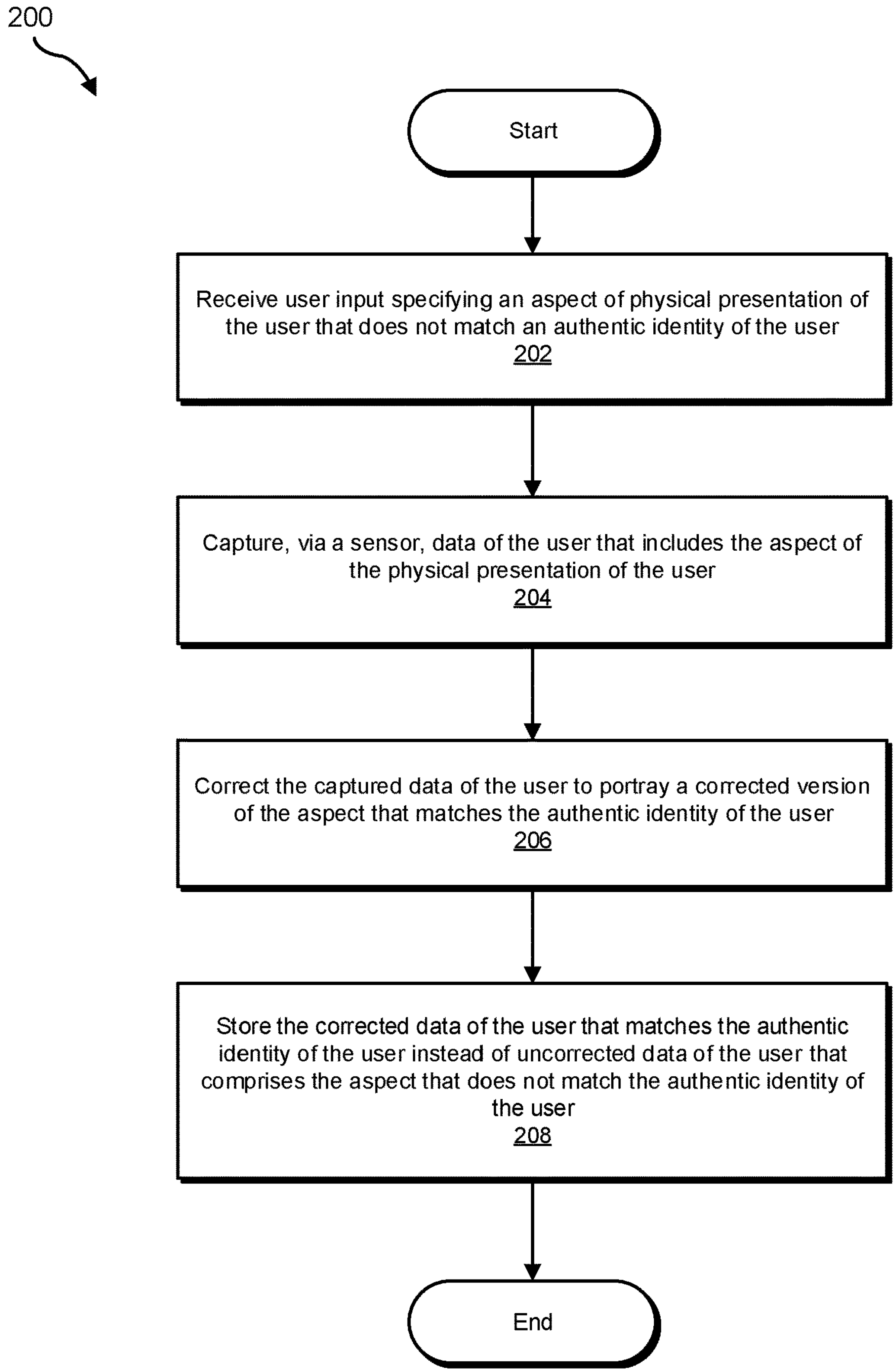
FIG. 2 is a flow diagram of an exemplary method for correcting data to match user identity.

FIG. 2 is a flow diagram of an exemplary method 200 for correcting data to match user identity. As illustrated in FIG. 2, at step 202, one or more of the systems described herein may receive user input specifying an aspect of physical presentation of the user that does not match an authentic identity of the user. For example, receiving module 108 may, as part of computing device 102 in FIG. 1, receive user input 118 specifying an aspect of physical presentation of the user that does not match an authentic identity of the user.

The term "aspect of physical presentation" or "physical aspect" may generally refer to any characteristic of a user's body, voice, and/or movement. For example, an aspect of physical presentation may be a sexually dimorphic characteristic such as hair, bone structure, and body fat distribution. In another example, a physical aspect may be a culturally associated gender presentation signal, such as hair length and/or style. In some examples, an aspect of physical presentation may be caused by an injury, such as scar tissue and/or missing flesh. In one example, an aspect of physical presentation may be a symptom and/or lingering effect of an illness, such as facial drooping and/or slurred speech following a stroke.

The term "authentic identity" may generally refer to a user's internal concept of how the user's body should look, move, and/or sound. In one example, a user's authentic identity may include an internal kinesthetic model of their body (e.g., a realistic version of the user that reflects an internal self-image of the user). In some examples, a physical appearance component of a user's authentic identity may be based on an internal culturally based model of the user's identity. For example, a user who is a transman may not have specific masculine features that he identifies with (e.g., a beard of a certain length, a specific shoulder width measurement, etc.) but may desire to have a physical appearance that is immediately perceived by others as masculine. In some examples, a mismatch between the user's authentic identity and the user's current physical presentation may cause dysmorphia and/or dysphoria to the user. Additionally, being incorrectly identified by others (e.g., misgendered) or being identified as being gender non-conforming, visibly injured, ill, etc., may have negative social ramifications for the user that are not present if the user is able to present as their authentic identity. In one example, a user's authentic identity may include the user's sense of self. In one embodiment, a user's authentic identity may be a realistic version of the user's self that reflects the user's identity. For example, a trans man's authentic identity may be as a man with broad shoulders, a flat chest, and a beard, which may not be currently reflected by his physical body but may be a realistic version of a human body. By contrast, a version of a user's face with digitally added cat ears or a cartoon mustache may not be realistic nor may it reflect the user's authentic identity. In one example, a stroke survivor's authentic identity may match their pre-stroke condition of having even facial features and clear speech, rather than their present physical state of having drooping facial features and slurred speech.

Receiving module 108 may receive the user input in a variety of ways. In some examples, a user may select from one or more lists of possible options. For example, a user may select from a list of conditions affecting aspects of physical presentation, such as injuries, symptoms of illnesses, and/or gender presentation. In some examples, a user may select from a list of types of data to be corrected, such as visual data and/or audio data. In some embodiments, a user may select from one or more additional lists generated based on the user's initial selection. For example, if a user selects injury, the systems described herein may generate a list of potential injures and/or potentially injured body parts. Additionally or alternatively, the systems described herein may automatically detect the aspect of physical presentation. For example, the systems described herein may use a machine learning model trained on data of injured and uninjured people to detect visible scarring caused by injuries.

In one embodiment, the systems described herein may identify one or more physical aspects for potential correction and prompt ask the user for confirmation. For example, the user may select that the aspect is an injury, the systems described herein may detect that the user's face is heavily scarred, and the systems described herein may prompt the user to confirm that the facial scarring is the physical aspect that does not match the user's authentic identity. In another example, if the user selects gender presentation, the systems described herein may automatically identify multiple sexually dimorphic characteristics to correct to match the user's gender identity.

In one embodiment, the systems described herein may include a gender presentation slider. For example, a user whose gender identity is highly masculine may select a position at the masculine end of the slider while a user whose gender identity is more androgynous may select a position closer to the center of the slider. The systems described herein may identify the position of the slider and correct physical aspects based on the slider position.

In some examples, the systems described herein may be constantly active once initiated. In other examples, the systems described herein may include a toggle that toggles between two specific states. For example, a user who is receiving treatment for a medical condition may toggle presentation correction on during most social encounters but off during a video call with their doctor. In another example, the systems described herein may enable a user to toggle between a masculine and feminine version of themself. For example, a toggle may enable a transwoman who is in the process of transitioning to present as a woman the majority of the time, but as a man during a video call with an elderly relative with Alzheimer's who would otherwise not recognize her. In this example, the systems described herein may correct the user's features to a more masculine version in one setting and a more feminine version in the other. In another example, the toggle may enable genderfluid and/or Two Spirit users may present as the gender identity that is correct for them at a given time.

At step 204, one or more of the systems described herein may capture, via a sensor, data of the user that may include the aspect of the physical presentation of the user. For example, capturing module 110 may, as part of computing device 102 in FIG. 1, capture, via sensor 120, data 122 of the user that may include the aspect of the physical presentation of the user.

Capturing module 110 may capture various types of data. For example, capturing module 110 may capture audio data of the user (e.g., data of a user's voice) via a microphone. In some examples, capturing module 110 may capture visual data of the user (e.g., data of the user's appearance) via a camera. In one example, a camera may capture a still image of a user. In another example, a camera may capture video of a user. In some embodiments, multiple cameras may capture videos of the user from multiple angles to facilitate the creation of a three-dimensional model of the user (e.g., for insertion into artificial reality environments). In some embodiments, additional sensors may capture data about the user, such as depth sensors, position sensors, and/or biometric sensors.

At step 206, one or more of the systems described herein may correct the captured data of the user to portray a corrected version of the aspect that matches the authentic identity of the user. For example, correction module 112 may, as part of computing device 102 in FIG. 1, correct the captured data 122 of the user to portray a corrected version of the aspect that matches the authentic identity of the user.

Correction module 112 may correct the data in a variety of ways. In some embodiments, correction module 112 may use a machine learning model and/or algorithm to correct the data. For example, the systems described herein may train a machine learning model on a large set of labelled data of sexually dimorphic characteristics and may use that model to correct a user's data to match the user's gender identity. In some examples, the systems described herein may train a machine learning model on voice recordings of users speaking known words, videos of facial expressions, videos of body movements, and/or any other suitable data of various body types performing actions and/or producing audio. In some embodiments, correction module 112 may use multiple models and/or algorithms to correct the user's data. For example, correction module 112 may use one algorithm to correct visual data and a separate algorithm to correct audio data. In some embodiments, correction module 112 may use different models and/or algorithms to correct different physical aspects. For example, correction module 112 may use one algorithm to remove facial scarring and another algorithm to restore a missing portion of a user's ear.

In some embodiments, correction module 112 may construct a still image, an audio stream or recording, a video, and/or a three-dimensional model such as a mesh, light field, or point cloud of the user that matches the user's authentic identity. In one example, correction module 112 may correct static data that is stored for potential later transmission, such as a still image or a recording. In other examples, correction module 112 may correct data in real-time as the data is captured by capturing module 110, as in the case of streaming audio and/or video. In some embodiments, correction module 112 may produce photorealistic data that is difficult or impossible to distinguish from unaltered data. For example, correction module 112 may produce an image of a user that is difficult for a human viewer to identify as an altered image rather than an unretouched image. Additionally or alternatively, correction module 112 may produce data that is difficult for an algorithm to identify as digitally altered data.

At step 208, one or more of the systems described herein may store the corrected data of the user that matches the authentic identity of the user instead of uncorrected data of the user that includes the aspect that does not match the authentic identity of the user. For example, storage module 114 may, as part of computing device 102 in FIG. 1, store corrected data 124 of the user that matches the authentic identity of the user instead of uncorrected data 122.

In some embodiments, storage module 114 may store the corrected data in long-term storage, such as a hard drive and/or solid state drive. Additionally or alternatively, storage module 114 may store the corrected data temporarily while the systems described herein are in the process of transmitting the corrected data to an additional device and/or server. For example, storage module 114 may temporarily store corrected video data that is part of a video stream but may not store a recording of the video data after the stream has concluded.

Figure 3:
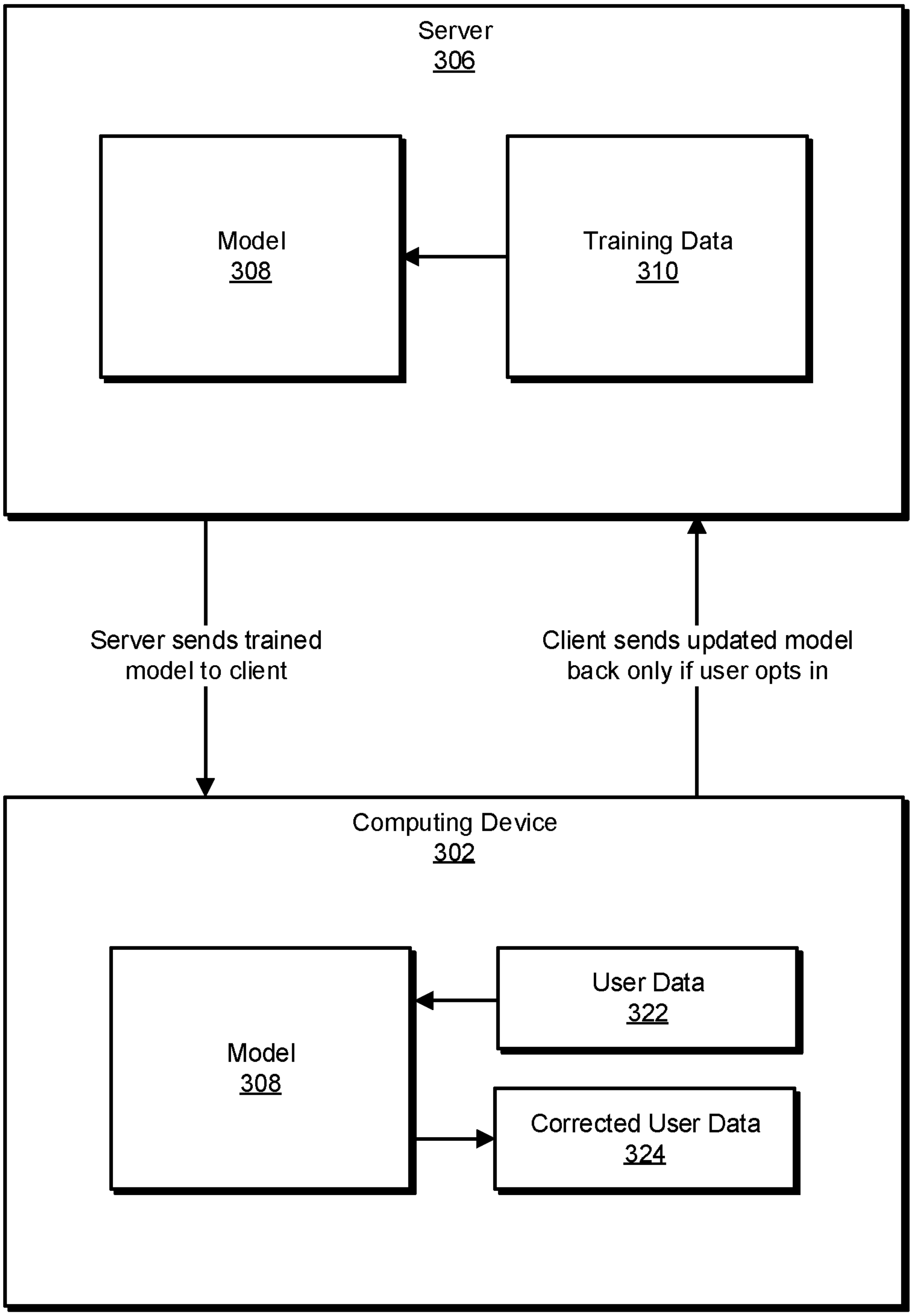
FIG. 3 is an additional illustration of an exemplary system for correcting data to match user identity.

In some embodiments, the systems described herein may correct user data entirely on an endpoint device (e.g., a personal computing device operated by the user) without the uncorrected data ever leaving the endpoint device. By correcting data without ever transmitting the data to another device, the systems described herein may use end-to-end encryption to enhance the security of the data. In one embodiment, the systems described herein may correct the data via a machine learning model trained on a server but may only send user data to the server with the user's permission. For example, as illustrated in FIG. 3, a server 306 may train a machine learning model 308 with training data 310. In some embodiments, training data 310 may be a generic data set built using information from many individuals and/or sources and may not initially include any information about a particular user (e.g., the operator of a computing device 302). Although illustrated as single elements, server 306 may represent multiple connected physical and/or virtual servers, machine learning model 308 may represent multiple models hosted on one or more servers, and/or training data 310 may represent multiple data sets hosted on one or more servers. In some embodiments, the systems described herein may use homomorphic encryption and/or processing to support the client (e.g., computing device 302). In one embodiment, the systems described herein may access and/or update a model entirely on one or more clients (e.g., a phone and a laptop operated by the same user) but may store the model in encrypted form on a server (e.g., as a backup, to enable upload from one client and download from another client, etc.). In this embodiment, the model may be encrypted at any time when the model is not on a client device (e.g., when in transmission, when stored on the server, etc.).

In one embodiment, computing device 302 may receive model 308 from server 306. In some examples, computing device 302 may transform user data 322 into corrected user data 324 via model 308. In some embodiments, computing device 302 may train and/or update the local copy of model 308 with data specific to and/or gathered about the user. For example, the systems described herein may train model 308 to more accurately model the particular user's facial expressions and/or speech patterns. In some embodiments, the systems described herein may update model 308 over time as a user's appearance changes (e.g., due to ageing, transitioning, recovering from injury, etc.). In some examples, by training the local iteration of model 308, the systems described herein may improve the quality of corrected data 322 over time. For example, the systems described herein may improve the resolution and/or realism of visible features and/or the accuracy of audio. In some embodiments, the systems described herein may provide the user with an option to opt in to sharing data with the server. If the user opts in, the systems described herein may send data about the user and/or the updated local version of model 308 to server 306 in order to improve the server version of model 308.

Figure 4:
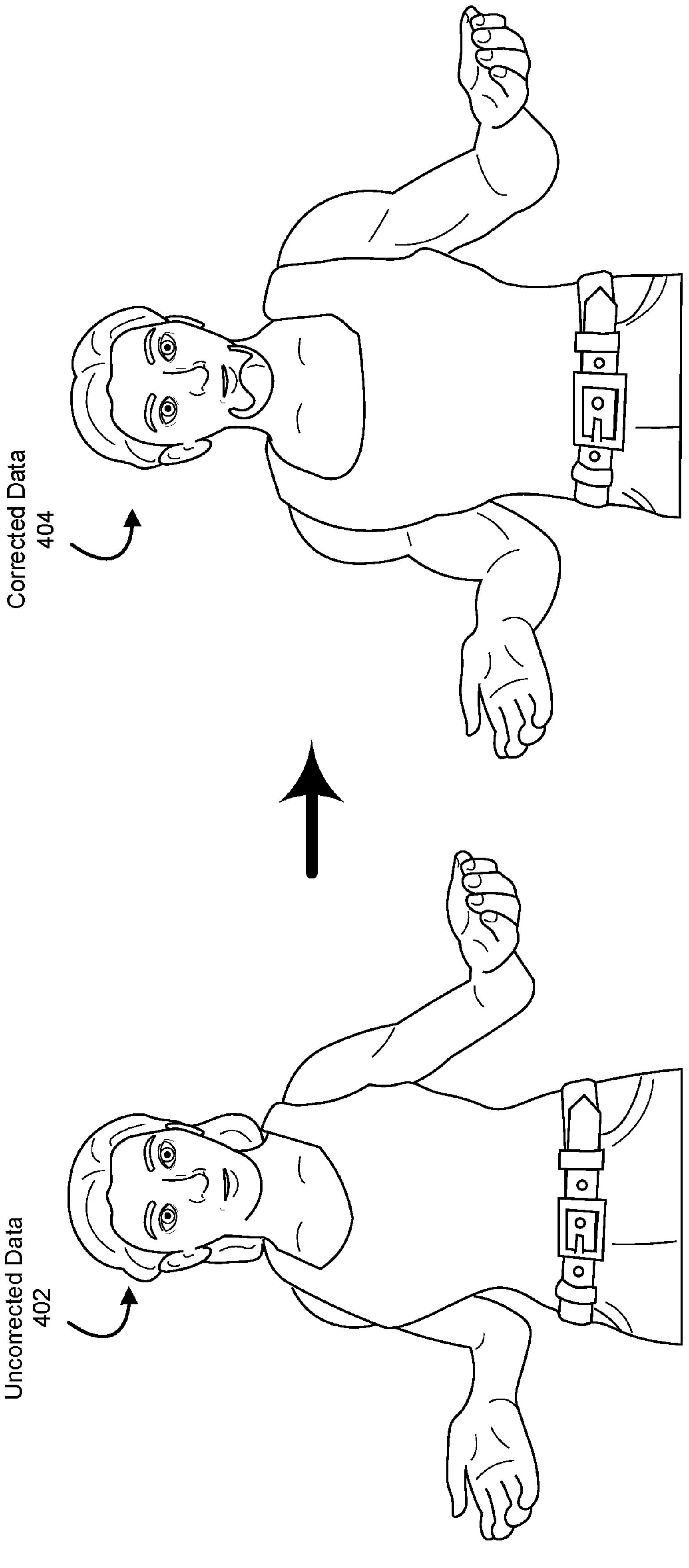
FIG. 4 is an illustration of exemplary uncorrected and corrected data.

In some embodiments, the systems described herein may correct user data to match a user's authentic identity by correcting user data to match the user's gender identity. For example, as illustrated in FIG. 4, uncorrected data 402 may portray a user in a way that many people are likely to identify as feminine, which may be inaccurate and/or distressing if the user is a man. In some examples, the systems described herein may identify physical aspects such as facial hair, hair style, shoulder width, waist-to-hip ratio, fat distribution, muscle mass, and/or vocal pitch that do not match the user's authentic identity as a man. In one example, the systems described herein may modify these physical aspects to produce corrected data 404 that matches the user's authentic identity as a man. In some embodiments, the systems described herein may automatically identify and modify sexually dimorphic characteristics without soliciting individual input from the user about each characteristic. In one embodiment, the systems described herein may automatically modify some characteristics while soliciting user input about other characteristics. For example, the systems described herein may automatically modify shoulder width, waist-to-hip ratio, fat distribution, muscle mass, and/or vocal pitch without soliciting user input but may solicit user input about facial hair and/or hair style.

In some embodiments, as the user transitions, the systems described herein may update the correction to seamlessly produce a consistent presentation. For example, the systems described herein may initially drop the user's vocal pitch by an octave to reach a masculine vocal pitch. As testosterone alters the user's vocal cords and deepens the user's voice, the systems described herein may drop the user's vocal pitch by progressively smaller increments to arrive at the same masculine vocal pitch. In some examples, the systems described herein may stop correcting the user's vocal pitch once the user's own vocal pitch reaches the corrected masculine vocal pitch. Similarly, the systems described herein may update visual corrections to muscle mass, fat distribution, etc., as the user's body changes to more accurately reflect the user's masculine identity and become closer to the corrected data.

Figure 5:
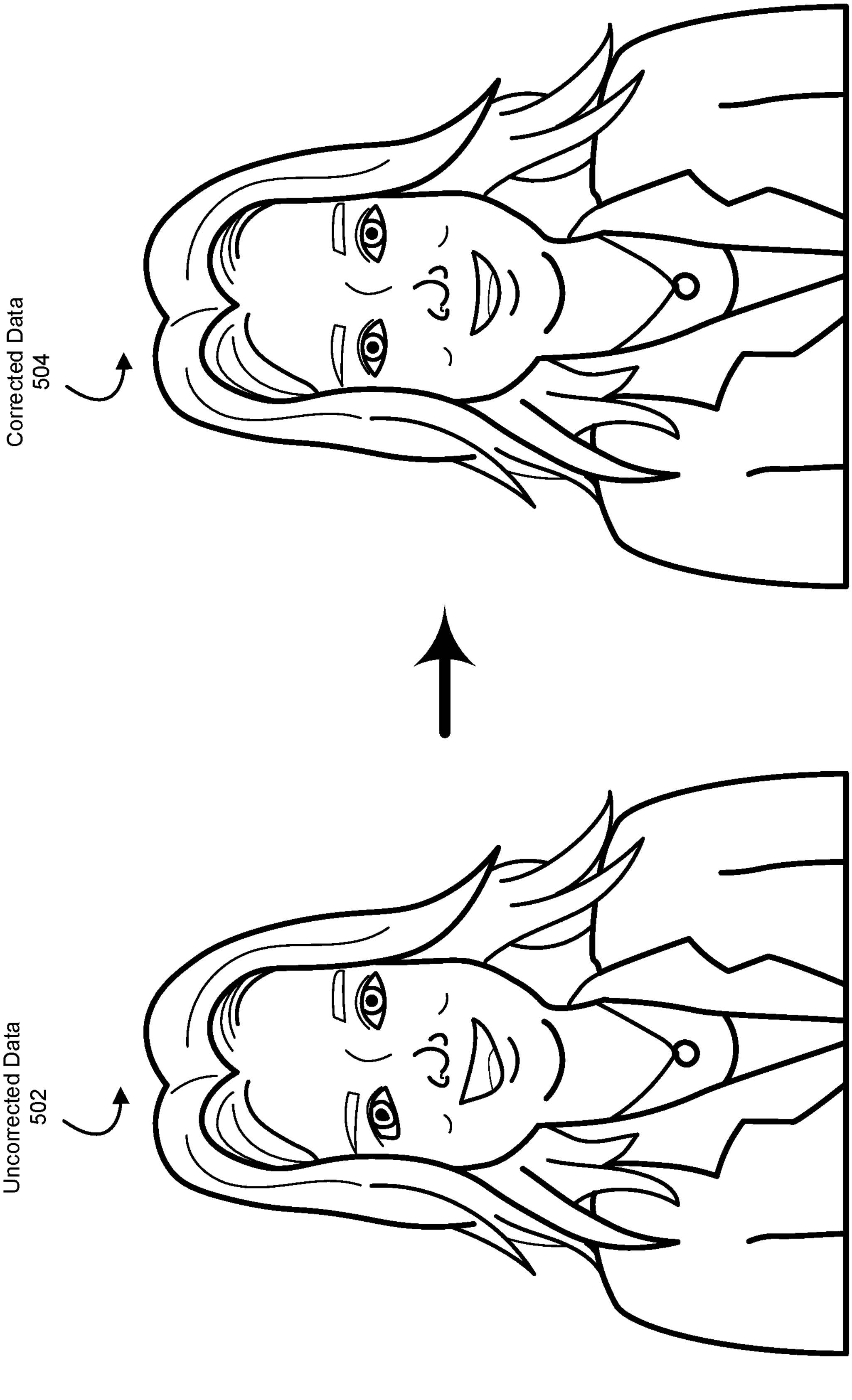
FIG. 5 is an additional illustration of exemplary uncorrected and corrected data.

In some embodiments, the systems described herein may correct user data to match a user's authentic identity by correcting effects a medical condition such as an injury and/or illness. For example, as illustrated in FIG. 5, uncorrected data 502 may include visible and/or audible symptoms of a stroke, such as drooping facial features and/or slurred speech. In one embodiment, the systems described herein may produce corrected data 504 with even facial features and/or clear speech. In some examples, as the user's stroke symptoms improve, the systems described herein may update the corrections so that the corrected data remains consistent. For example, as the user's facial muscles recover, the systems described herein may apply a decreasing amount of correction to the visual data.

Figure 6:
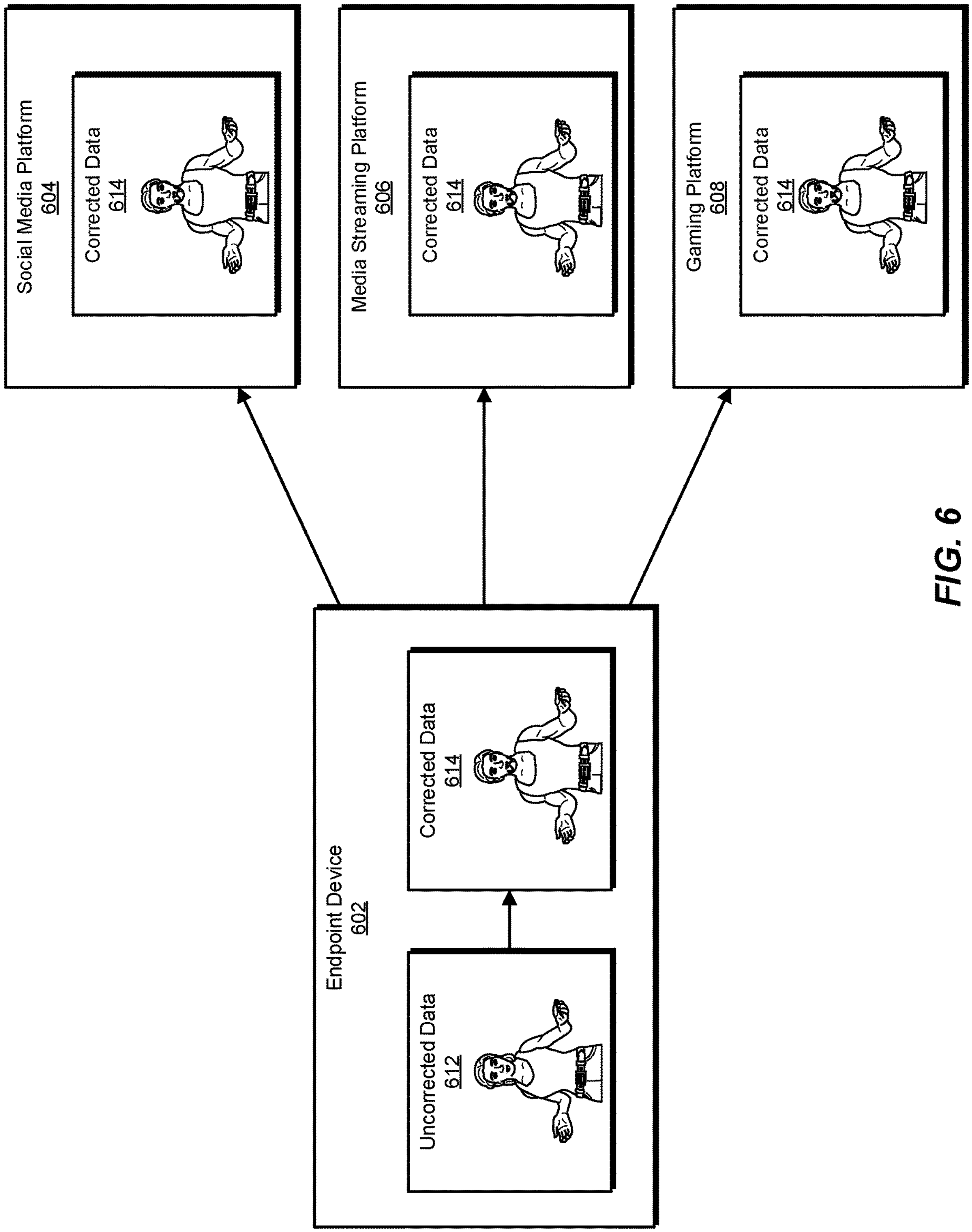
FIG. 6 is a block diagram of an exemplary system for correcting data to match user identity across multiple platforms.

In some embodiments, the systems described herein may transmit corrected data to multiple platforms and/or servers. For example, as illustrated in FIG. 6, an endpoint device 602 may be configured with the systems described herein and may produce corrected data 614 from uncorrected data 612. In some examples, the systems described herein may transmit the same corrected data. For example, the corrected data may be an image and the systems described herein may transmit the same image to multiple platforms. In one example, the systems described herein may upload corrected data 614 as a user profile image to a social media platform 604, a media streaming platform 606, and/or a gaming platform 608. Additionally or alternatively, the systems described herein may transmit different iterations of the corrected data. For example, the systems described herein may transmit a corrected video stream to social media platform 604 and may, at a later time, transmit a different corrected video stream to gaming platform 608 that is subject to the same corrections and portrays the same authentic identity as the video stream transmitted to social media platform 604. In this way the systems described herein may enable a user to maintain a consistent, authentic presentation across multiple platforms.

Figure 7:
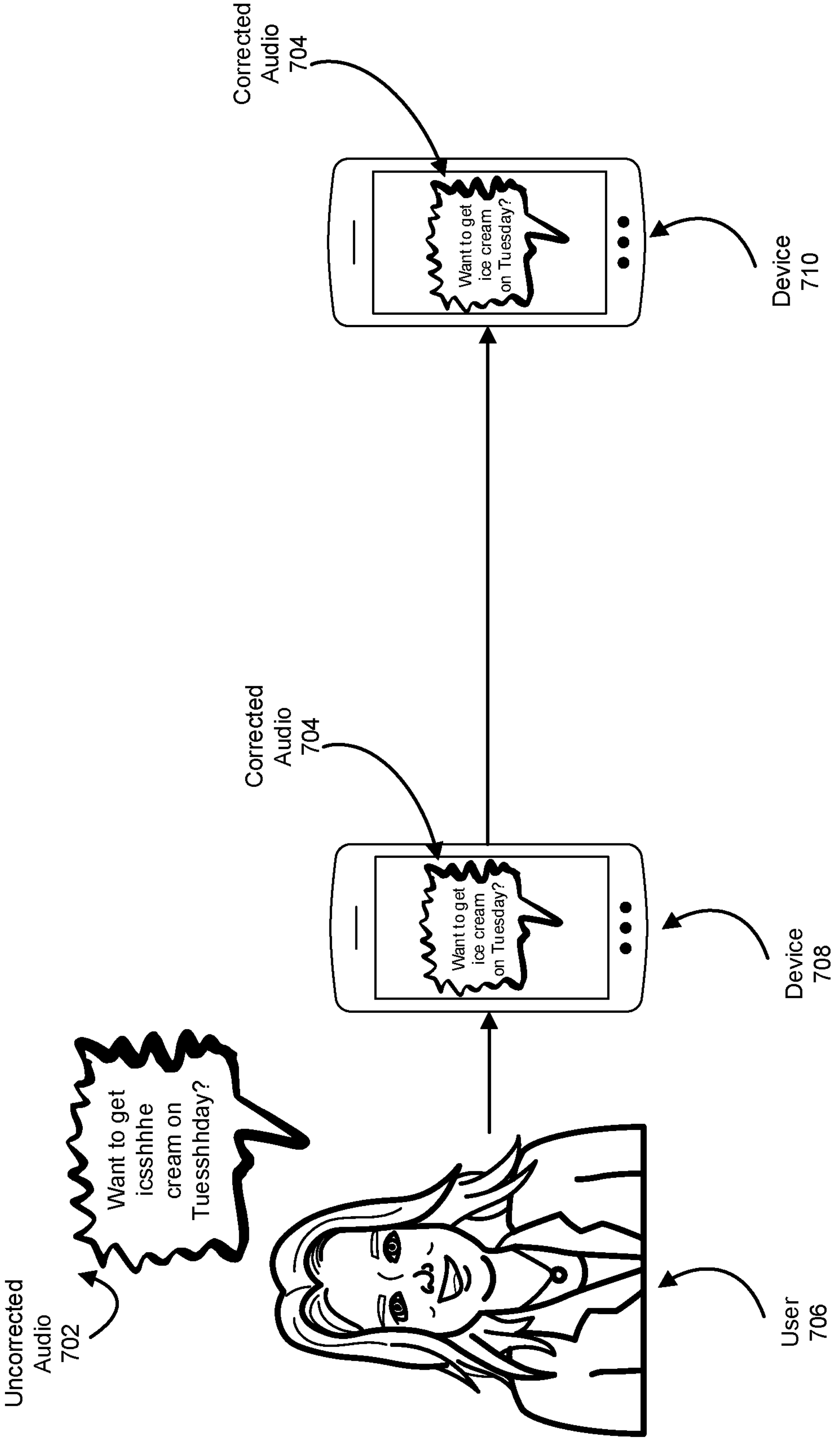
FIG. 7 is an illustration of exemplary uncorrected and corrected audio data.

In some examples, the systems described herein may transmit corrected audio. For example, as illustrated in FIG. 7, a user 706 speaking may produce uncorrected audio 702 that may not match the authentic identity of user 706. For example, uncorrected audio 702 may be slurred due to stroke symptoms. In one example, a device 708 may be configured with the systems described herein that may correct uncorrected audio 702 to corrected audio 704 by removing the slurring, leaving clear speech that is still recognizably in the user's voice. The systems described herein may transmit corrected audio 704 (e.g., by a network such as a wi-fi and/or cellular network) to a device 710, enabling user 706 to have an audio conversation (e.g., a voice call and/or phone call) with another user with clear, un-slurred speech that matches the authentic identity of user 706.

In some embodiments, the systems described herein may create and/or transmit corrected data for an artificial reality environment. The term "artificial reality (AR)" generally describes a form of reality that has been adjusted in some manner before presentation to a user, which may include, for example, a virtual reality, an augmented reality, a mixed reality, a hybrid reality, or some combination and/or derivative thereof. AR content may include completely computer-generated content or computer-generated content combined with captured (e.g., real-world) content. The AR content may include video, audio, haptic feedback, or some combination thereof, any of which may be presented in a single channel or in multiple channels (such as stereo video that produces a three-dimensional (3D) effect to the viewer).

Figure 8:
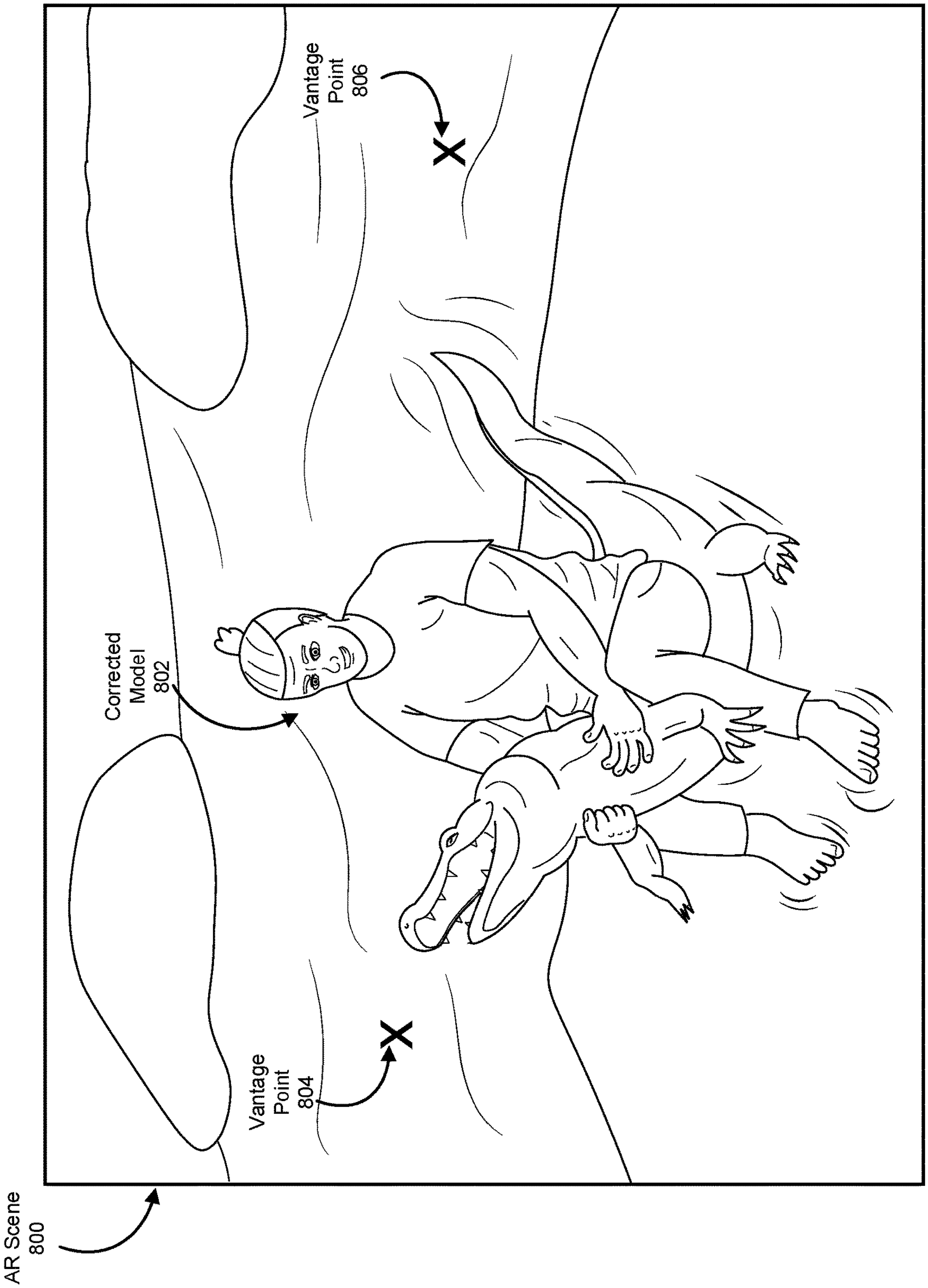
FIG. 8 is an illustration of exemplary corrected artificial reality data.

In some embodiments, the systems described herein may correct one or more physical aspects of a user as part of the process of creating a three-dimensional model of a user for insertion into an AR environment. In one embodiment, the systems described herein may correct data and then build a model based on the corrected data. Additionally or alternatively, the systems described herein may build a model based on the uncorrected data and then correct the model. For example, as illustrated in FIG. 8, the systems described herein may insert a model 802 of a user into an AR scene 800. In one example, AR scene 800 may be part of an alligator wrestling AR game. In some examples, the systems described herein may create model 802 by capturing video data of a user from multiple angles (e.g., from multiple cameras) and then correcting the video data to match the user's authentic identity. In one embodiment, the systems described herein may enable additional users to view model 802 from different vantage points, portraying the corrected presentation of model 802 that matches the user's authentic identity regardless of viewing angle. For example, spectators in the alligator wrestling AR game may view model 802 from a vantage point 804 and/or a vantage point 806. Because the systems described herein correct the full three-dimensional model and not just a two-dimensional video of the user, viewers from any vantage point may see a representation of the user's authentic identity without incongruities or glitches that suggest that model 802 has been digitally edited and does not match the user's current physical body.

As described above, the systems and methods described herein may enable authentic interaction in digital spaces by users whose current physical presentation may not match their identity. For example, a transman having an audio conversation with a client with whom he has previously only exchanged emails may be concerned that the client will question his identity due to his feminine-sounding voice. By using the systems described herein to correct his voice to a deeper pitch that matches his identity, he may maintain a consistent presentation regardless of communication medium. In another example, an acid attack victim may feel ashamed to participate in video calls due to her facial scarring. The systems described herein may eliminate the visual scarring from video of the user, enabling the user to participate in video calls as her authentic self without shame. By enabling users to present a consistent, authentic identity across multiple platforms, the systems described herein may enable users to fully participate in digital spaces without fear or shame.

As mentioned above, embodiments of the present disclosure may include or be implemented in conjunction with various types of AR systems. Artificial-reality systems may be implemented in a variety of different form factors and configurations. Some AR systems may be designed to work without near-eye displays (NEDs). Other AR systems may include an NED that also provides visibility into the real world (such as, e.g., augmented-reality system 900 in FIG. 9) or that visually immerses a user in an AR (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
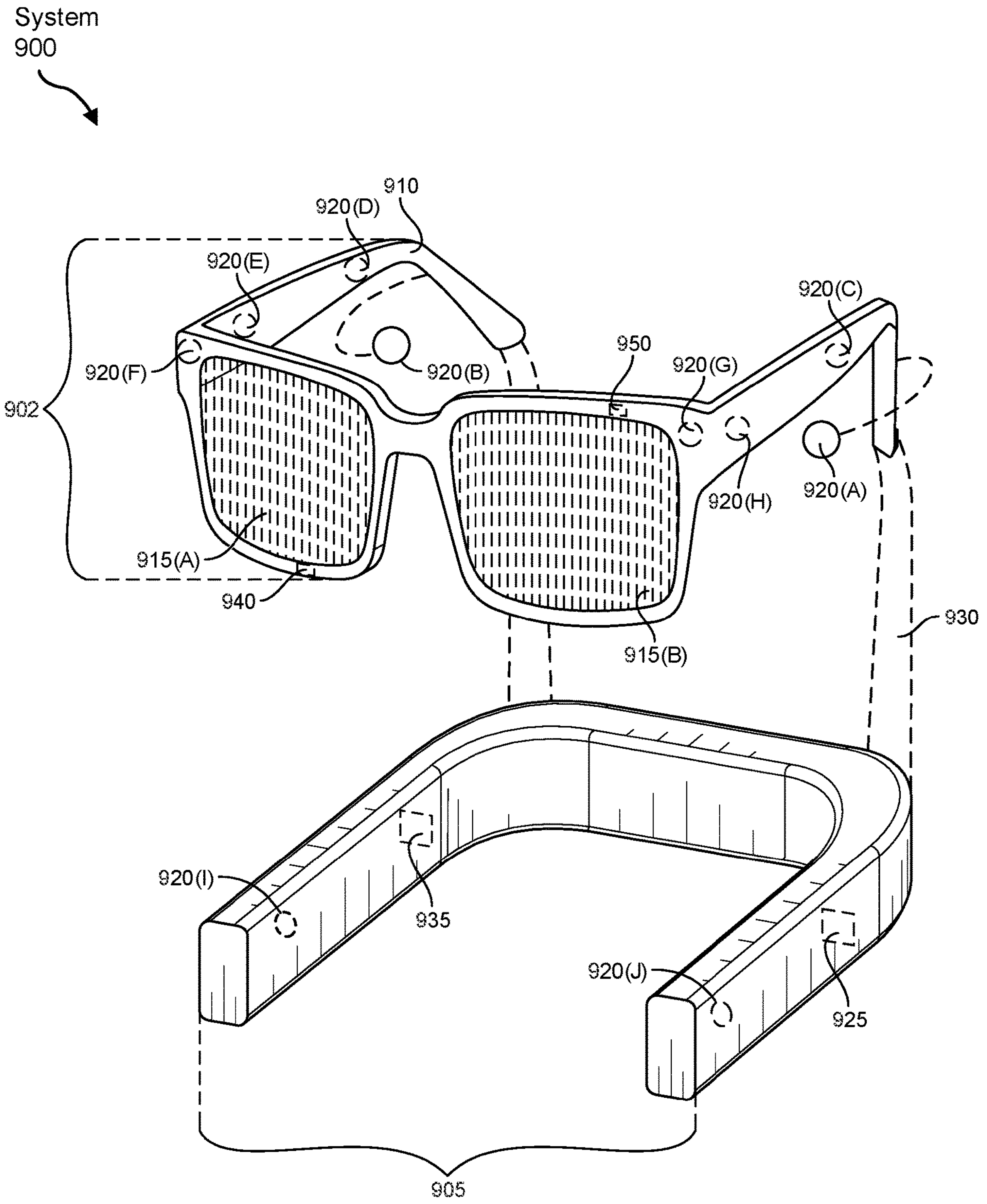
FIG. 9 is an illustration of exemplary augmented-reality glasses that may be used in connection with embodiments of this disclosure.
Figure 10:
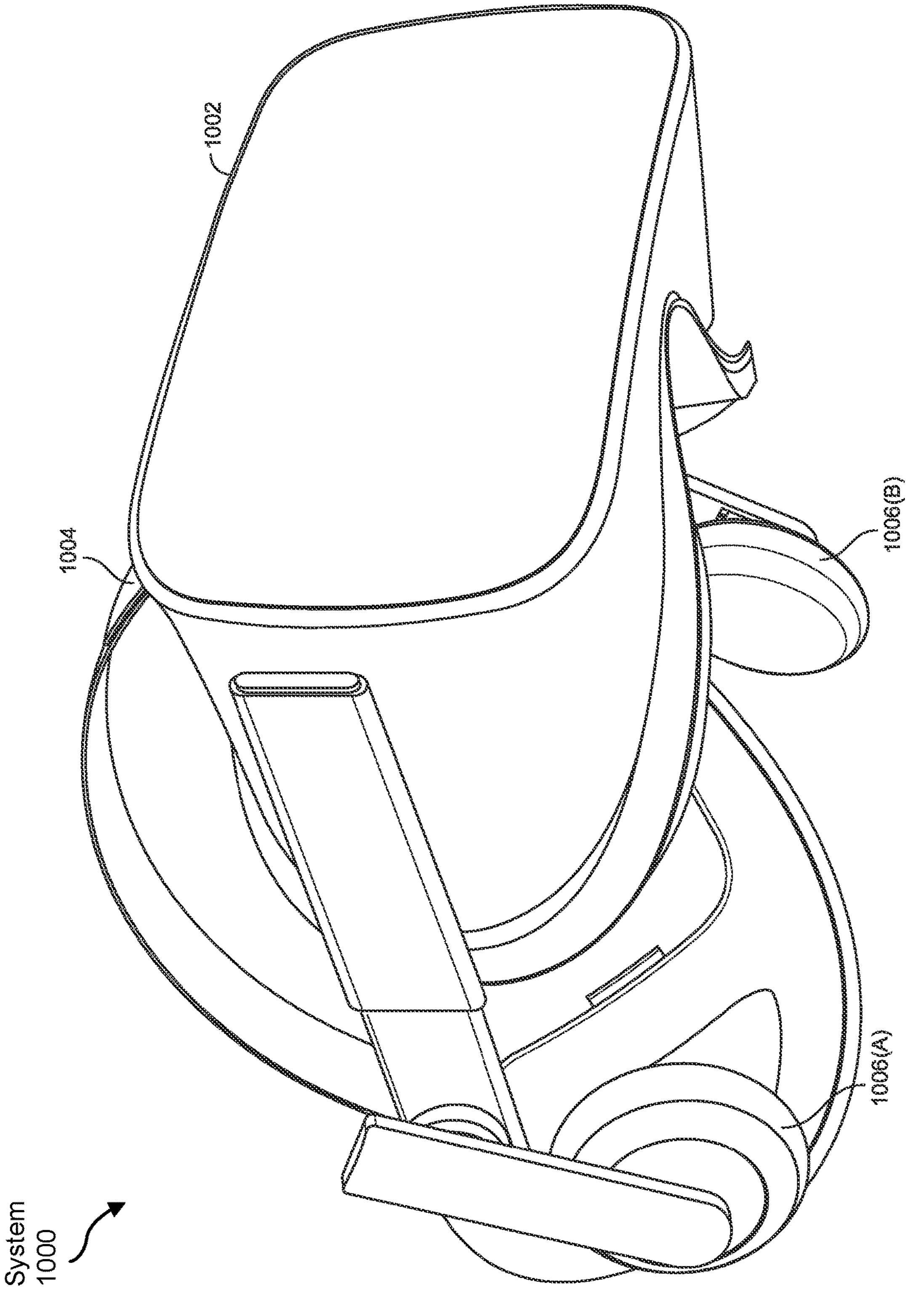
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-120(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate AR environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920(D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some AR systems may, instead of blending an AR with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

AR systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These AR systems may include a single display screen for both eyes or may provide a display screen for each eye, which may allow for additional flexibility for varifocal adjustments or for correcting a user's refractive error. Some of these AR systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the AR systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both AR content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. AR systems may also be configured with any other suitable type or form of image projection system, such as retinal projectors used in virtual retina displays.

The AR systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An AR system may process data from one or more of these sensors to identify a location of a user, to map the real world, to provide a user with context about real-world surroundings, and/or to perform a variety of other functions.

The AR systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the AR systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other AR devices, within other AR devices, and/or in conjunction with other AR devices.

By providing haptic sensations, audible content, and/or visual content, AR systems may create an entire virtual experience or enhance a user's real-world experience in a variety of contexts and environments. For instance, AR systems may assist or extend a user's perception, memory, or cognition within a particular environment. Some systems may enhance a user's interactions with other people in the real world or may enable more immersive interactions with other people in a virtual world. AR systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's AR experience in one or more of these contexts and environments and/or in other contexts and environments.

EXAMPLE EMBODIMENTS

Example 1: A method for correcting data to match user identity may include (i) receiving user input specifying an aspect of physical presentation of the user that does not match an authentic identity of the user, where the authentic identity of the user includes a realistic version of the user that reflects an internal self-image of the user, (ii) capturing, via a sensor, data of the user that includes the aspect of the physical presentation of the user, (iii) correcting the captured data of the user to portray a corrected version of the aspect that matches the authentic identity of the user, and (iv) storing the corrected data of the user that matches the authentic identity of the user instead of uncorrected data of the user that includes the aspect that does not match the authentic identity of the user.

Example 2: The computer-implemented method of example 1 may further include identifying a machine learning model trained to correct the aspect to the corrected version of the aspect and correcting the captured data via the machine learning model.

Example 3: The computer-implemented method of examples 1-2, where identifying the machine learning model may include receiving from a server, by an endpoint device, a machine learning model trained on the server with data that does not include data about the user and the computer-implemented method may further include updating, on the endpoint device, the machine learning model with data gathered about the user.

Example 4: The computer-implemented method of examples 1-3, where the receiving, capturing, correcting, and storing steps are performed on an endpoint device.

Example 5: The computer-implemented method of examples 1-4 may further include transmitting the corrected data to a server.

Example 6: The computer-implemented method of examples 1-5, where (i) receiving the user input includes receiving a gender presentation selection from the user, (ii) the aspect of physical presentation that does not match the authentic identity of the user includes at least one sexually dimorphic characteristic that does not match the gender presentation, and (iii) correcting the captured data of the user to portray the corrected version of the aspect includes modifying the sexually dimorphic characteristic within the captured data to reflect the gender presentation selected by the user.

Example 7: The computer-implemented method of examples 1-6, where receiving the gender presentation selection from the user may include displaying a gender presentation slider to the user and identifying a position of the gender presentation slider selected by the user.

Example 8: The computer-implemented method of examples 1-7, where modifying the sexually dimorphic characteristic within the captured data to reflect the gender presentation selected by the user may include automatically modifying a group of sexually dimorphic characteristics without soliciting individual input from the user about each characteristic within the sexually dimorphic characteristics.

Example 9: The computer-implemented method of examples 1-8, where the aspect of physical presentation includes at least one of a visible or audible effect of a medical condition of the user and/or the authentic identity of the user includes a version of the user without the medical condition.

Example 10: The computer-implemented method of examples 1-9 may further include detecting that the aspect of physical presentation has changed to more closely match the authentic identity of the user but does not fully match the authentic identity of the user and correcting the captured data of the user to portray a consistent version of the corrected version of the aspect as the aspect changes over time.

Example 11: The computer-implemented method of examples 1-10, where correcting the captured data of the user includes correcting the captured data in real-time as the data is captured and further comprising streaming the corrected data to a server in real-time.

Example 12: The computer-implemented method of examples 1-11, where the data of the user that includes the aspect of the physical presentation may include at least one of audio data of the user or visual data of the user.

Example 13: The computer-implemented method of examples 1-12, where the at least one of audio data of the user or visual data of the user may include (i) audio of the user's voice, (ii) video data of the user's appearance, and/or (iii) image data of the user's appearance.

Example 14: The computer-implemented method of examples 1-13 may further include enabling a consistent authentic presentation for the user across platforms by transmitting the same version of the corrected data to each platform within a group of platforms.

Example 15: A system for correcting data to match user identity may include at least one physical processor and physical memory including computer-executable instructions that, when executed by the physical processor, cause the physical processor to (i) receive user input specifying an aspect of physical presentation of the user that does not match an authentic identity of the user, where the authentic identity of the user includes a realistic version of the user that reflects an internal self-image of the user, (ii) capture, via a sensor, data of the user that includes the aspect of the physical presentation of the user, (iii) correct the captured data of the user to portray a corrected version of the aspect that matches the authentic identity of the user, and (iv) store the corrected data of the user that matches the authentic identity of the user instead of uncorrected data of the user that includes the aspect that does not match the authentic identity of the user.

Example 16: The system of example 15, where the computer-executable instructions cause the physical processor to (i) identify a machine learning model trained to correct the aspect to the corrected version of the aspect and (ii) correct the captured data via the machine learning model.

Example 17: The system of examples 15-16, where identifying the machine learning model includes receiving from a server, by an endpoint device, a machine learning model trained on the server with data that does not include data about the user and the computer-executable instructions cause the physical processor to update, on the endpoint device, the machine learning model with data gathered about the user.

Example 18: The system of examples 15-17, where the at least one physically processor and/or physical memory are components of an endpoint device.

Example 19: The system of examples 15-18, where the computer-executable instructions cause the physical processor to transmit the corrected data to a server.

Example 20: A non-transitory computer-readable medium may include one or more computer-readable instructions that, when executed by at least one processor of a computing device, cause the computing device to (i) receive user input specifying an aspect of physical presentation of the user that does not match an authentic identity of the user, where the authentic identity of the user includes a realistic version of the user that reflects an internal self-image of the user, (ii) capture, via a sensor, data of the user that includes the aspect of the physical presentation of the user, (iii) correct the captured data of the user to portray a corrected version of the aspect that matches the authentic identity of the user, and (iv) store the corrected data of the user that matches the authentic identity of the user instead of uncorrected data of the user that includes the aspect that does not match the authentic identity of the user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term “memory device” generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term “physical processor” generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term “computer-readable medium” generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms “connected to” and “coupled to” (and their derivatives), as used in the specification and claims, are to be construed as permitting both direct and indirect (i.e., via other elements or components) connection. In addition, the terms “a” or “an,” as used in the specification and claims, are to be construed as meaning “at least one of.” Finally, for ease of use, the terms “including” and “having” (and their derivatives), as used in the specification and claims, are interchangeable with and have the same meaning as the word “comprising.”

What is claimed is:

1. A computer-implemented method comprising:

receiving user input specifying an aspect of physical presentation of the user that does not match an authentic identity of the user, wherein the authentic identity of the user comprises a realistic version of the user that reflects an internal self-image of the user;

capturing, via a sensor and during a first live video stream, first data of the user that comprises the aspect of the physical presentation of the user;

determining a first difference between the first data and the authentic identity of the user;

correcting the first data of the user by a first amount to portray a first corrected version of the aspect that matches the authentic identity of the user;

presenting, during the first live video stream, the first corrected version of the aspect instead of the first data;

capturing, via the sensor and during a second live video stream, second data of the user that comprises the aspect of the physical presentation of the user;

determining a second difference between the second data and the authentic identity of the user, wherein the second difference is less than the first difference;

determining, based at least in part on the second difference, a change in the aspect in the second data relative to the first data, wherein the change indicates that the aspect in the second data is a closer match to the authentic identity of the user than the aspect in the first data;

correcting, based at least in part on the change in the aspect, the second data by a second amount to portray a second corrected version of the aspect that matches the authentic identity of the user, wherein the second amount is less than the first amount; and presenting, during the second live video stream, the second corrected version of the aspect instead of the second data.

2. The computer-implemented method of claim 1, wherein correcting the captured data of the user comprises:

identifying a machine learning model trained to correct the aspect to the first corrected version of the aspect; and correcting the captured data via the machine learning model.

3. The computer-implemented method of claim 2:

wherein identifying the machine learning model comprises receiving from a server, by an endpoint device, a machine learning model trained on the server with data that does not comprise data about the user; and further comprising updating, on the endpoint device, the machine learning model with data gathered about the user.

4. The computer-implemented method of claim 1, wherein the receiving, capturing, and correcting steps are performed on an endpoint device.

5. The computer-implemented method of claim 1, further comprising transmitting the corrected data to a server.

6. The computer-implemented method of claim 1, wherein:

receiving the user input comprises receiving a gender presentation selection from the user;

the aspect of physical presentation that does not match the authentic identity of the user comprises at least one sexually dimorphic characteristic that does not match the gender presentation; and correcting the captured data of the user to portray the first corrected version of the aspect comprises modifying the sexually dimorphic characteristic within the captured data to reflect the gender presentation selected by the user.

7. The computer-implemented method of claim 6, wherein receiving the gender presentation selection from the user comprises:

displaying a gender presentation slider to the user; and identifying a position of the gender presentation slider selected by the user.

8. The computer-implemented method of claim 6, wherein modifying the sexually dimorphic characteristic within the captured data to reflect the gender presentation selected by the user comprises automatically modifying a plurality of sexually dimorphic characteristics without soliciting individual input from the user about each characteristic within the plurality of sexually dimorphic characteristics.

9. The computer-implemented method of claim 1, wherein:

the aspect of physical presentation comprises at least one of a visible or audible effect of a medical condition of the user; and the authentic identity of the user comprises a version of the user without the medical condition.

10. The computer-implemented method of claim 1:

wherein correcting the captured data of the user comprises correcting the captured data in real-time as the data is captured; and further comprising streaming the corrected data to a server in real-time.

11. The computer-implemented method of claim 1, wherein the data of the user that comprises the aspect of the physical presentation comprises at least one of audio data of the user or visual data of the user.

12. The computer-implemented method of claim 11, wherein the at least one of audio data of the user or visual data of the user comprises at least one of:

audio of the user's voice;

video data of the user's appearance; or image data of the user's appearance.

13. The computer-implemented method of claim 1, further comprising enabling a consistent authentic presentation for the user across platforms by transmitting a same version of the corrected data to each platform within a plurality of platforms.

14. A system comprising:

at least one physical processor;

physical memory comprising computer-executable instructions that, when executed by the physical processor, cause the physical processor to:

receive user input specifying an aspect of physical presentation of the user that does not match an authentic identity of the user, wherein the authentic identity of the user comprises a realistic version of the user that reflects an internal self-image of the user;

capture, via a sensor and during a first live video stream, first data of the user that comprises the aspect of the physical presentation of the user;

determine a first difference between the first data and the authentic identity of the user;

correct the first data of the user by a first amount to portray a first corrected version of the aspect that matches the authentic identity of the user;

present, during the first live video stream, the first corrected version of the aspect instead of the first data;

capture, via the sensor and during a second live video stream, second data of the user that comprises the aspect of the physical presentation of the user;

determine a second difference between the second data and the authentic identity of the user, wherein the second difference is less than the first difference;

determine, based at least in part on the second difference, a change in the aspect in the second data relative to the first data, wherein the change indicates that the aspect in the second data is a closer match to the authentic identity of the user than the aspect in the first data;

correct, based at least in part on the change in the aspect, the second data by a second amount to portray a second corrected version of the aspect that matches the authentic identity of the user, wherein the second amount is less than the first amount; and present, during the second live video stream, the second corrected version of the aspect instead of the second data.

15. The system of claim 14, wherein correcting the captured data of the user comprises:

identifying a machine learning model trained to correct the aspect to the first corrected version of the aspect; and correcting the captured data via the machine learning model.

16. The system of claim 15, wherein:

identifying the machine learning model comprises receiving from a server, by an endpoint device, a machine learning model trained on the server with data that does not comprise data about the user; and the computer-executable instructions cause the physical processor to update, on the endpoint device, the machine learning model with data gathered about the user.

17. The system of claim 14, wherein the at least one physical processor and the physical memory are components of an endpoint device.

18. The system of claim 14, wherein the computer-executable instructions cause the physical processor to transmit the corrected data to a server.

19. A non-transitory computer-readable medium comprising one or more computer-readable instructions that, when executed by at least one processor of a computing device, cause the computing device to:

receive user input specifying an aspect of physical presentation of the user that does not match an authentic identity of the user, wherein the authentic identity of the user comprises a realistic version of the user that reflects an internal self-image of the user;

capture, via a sensor and during a first live video stream, first data of the user that comprises the aspect of the physical presentation of the user;

determine a first difference between the first data and the authentic identity of the user;

correct the captured data of the user to portray a first corrected version of the aspect that matches the authentic identity of the user;

present, during the first live video stream, the first corrected version of the aspect instead of the first data;

capture, via the sensor and during a second live video stream, second data of the user that comprises the aspect of the physical presentation of the user;

determine a second difference between the second data and the authentic identity of the user, wherein the second difference is less than the first difference;

determine, based at least in part on the second difference, a change in the aspect in the second data relative to the first data, wherein the change indicates that the aspect in the second data is a closer match to the authentic identity of the user than the aspect in the first data;

correct, based at least in part on the change in the aspect, the second data by a second amount to portray a second corrected version of the aspect that matches the authentic identity of the user, wherein the second amount is less than the first amount; and present, during the second live video stream, the second corrected version of the aspect instead of the second data.

* * * * *